United States Patent

Morimoto et al.

[11] Patent Number: 5,912,985
[45] Date of Patent: *Jun. 15, 1999

[54] PATTERN DETECTION METHOD

[75] Inventors: Masamichi Morimoto, Moriguchi, Japan; Ömür Bozma, Istanbul, Turkey; Junichi Hada, Katano, Japan

[73] Assignee: Matsushita Electric Industrial Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/551,847

[22] Filed: Nov. 7, 1995

[30] Foreign Application Priority Data

Nov. 8, 1994 [JP] Japan ................... 6-273875

[51] Int. Cl.⁶ ...................................... G06K 9/62
[52] U.S. Cl. ....................... 382/151; 382/217; 382/291
[58] Field of Search ......................... 382/151, 181, 382/219, 220, 291, 209, 217, 180, 278, 199; 348/129, 130

[56] References Cited

U.S. PATENT DOCUMENTS

| | | | |
|---|---|---|---|
| 5,018,218 | 5/1991 | Peregrim et al. | 382/199 |
| 5,136,661 | 8/1992 | Kobayasi et al. | 382/282 |
| 5,185,811 | 2/1993 | Beers et al. | 382/141 |
| 5,204,911 | 4/1993 | Schwartz et al. | 382/141 |
| 5,226,095 | 7/1993 | Okumura et al. | 382/282 |

OTHER PUBLICATIONS

Gonzalez et al. Digital Image Processing. Addison–Wesley Publishing Co., pp. 418–425, 1992.

*Primary Examiner*—Jon Chang
*Attorney, Agent, or Firm*—Wenderoth, Lind & Ponack, L.L.P.

[57] ABSTRACT

When an image of an object is recognized, a template having a size smaller than the object is used. First, operation reference points $C_s(X_m, Y_n)$ are set at steps smaller than lengths along the X and Y directions of an image of an object to be recognized, and a template $T(x_i, y_i)$ is set at the operation reference points $C_s(X_m, Y_n)$. Then, an equation, $$M(X_m, Y_n) = \sum_{i=0}^{l} T(x_i, y_i) \times P(X + x_i, Y + y_i)$$

is operated based on the template $T(x_i, y_i)$ and the image data $P(X, Y)$. Next, candidate points are determined as points having $M(X_m, Y_n)$ larger than a reference value. Then, a position of the image of the object is determined according to the candidate points. Even if an image to be recognized is inclined, the position and the slope of the image can be detected at a fast speed even for image data with noise.

8 Claims, 13 Drawing Sheets

| i | $T(x_i, y_i)$ | $x_i$ | $y_i$ |
|---|---|---|---|
| 0 | 1 | 0 | 0 |
| 1 | 1 | 2 | 0 |
| 2 | 1 | 4 | 0 |
| 3 | 1 | 0 | 2 |
| 4 | 1 | 2 | 2 |
| 5 | 1 | 4 | 2 |
| 6 | 1 | 0 | 4 |
| 7 | 1 | 2 | 4 |
| 8 | 1 | 4 | 4 |

| i | $T(x_i, y_i)$ | $x_i$ | $y_i$ | $P(X+x_i, Y+y_i)$ |
|---|---|---|---|---|
| 0 | $G_0$ | 0 | 0 | $P(X+0, Y+0)$ |
| 1 | $G_1$ | 4 | 0 | $P(X+4, Y+0)$ |
| 2 | $G_2$ | 2 | 1 | $P(X+2, Y+1)$ |
| 3 | $G_3$ | 1 | 2 | $P(X+1, Y+2)$ |
| 4 | $G_4$ | 4 | 3 | $P(X+4, Y+3)$ |
| 5 | $G_5$ | 0 | 4 | $P(X+0, Y+4)$ |
| 6 | $G_6$ | 4 | 4 | $P(X+4, Y+4)$ |

PATTERN DETECTION METHOD

BACKGROUND OF THE INVENTION

1. Field of the Invention

The present invention relates to a method of pattern detection for detecting positions of electronics parts and mounting positions

2. Description of the Prior Art

Various approaches for detecting positions of an object such as an electronics part are known. In template matching methods, a characteristic part of an object is previously obtained as a template, and a whole contour of an image of the object, or an image position of the object, is detected, and then position matching of the detected image of the object is performed with the template. In matched filter techniques, a matched filter is matched to a contour of an image of an object, and the image is scanned by using the filter. Windows are provided inside and outside the matched filter to detect the brightness in the windows, and a position of the image of an object is determined as a position having the largest difference between a sum of the brightness in the inside and the outside windows. In edge detection techniques, a processing area including an object is scanned along a constant direction using a plurality of windows to detect edge points (or boundaries) in each scan where the brightness changes largely, and a position of a contour edge line connecting the detected edge points is determined to be an image position of the object.

However, in the template matching techniques and the matched filter techniques, a template used in the template matching technique and a matched filter used the matched filter technique have the same shape as the image of the object to be recognized. Therefore, if the image of the object is inclined, its position becomes difficult to be detected or has a large detection error. Further, a slope of the image of the object cannot be determined based on the detected image. Then, in order to detect a position of an image of the object, repetitive scanning is performed with the slope of the template or the matched filter gradually changed, and this process takes a long time.

In the edge detection techniques, it is difficult to distinguish a contour of an image of an object to be recognized from point and linear noises. Thus, this technique is prone to be affected by noises, and an erroneous recognition, due to noises, may occur.

SUMMARY OF THE INVENTION

An object of the present invention is to provide a pattern detection method wherein even if an image to be recognized is inclined, a position and the slope of the image can be detected at a fast speed even for an image having noise.

In a pattern detection method according to the invention, when an image of an object is recognized, a template $T(x_i, y_i)$ having a size smaller than the object is used. The template has no resemblance to the image of the object. First, operation reference points $C_s(X_m, Y_n)$ are set at steps which are smaller than lengths of the image of the object to be recognized along the X and Y directions. The template is set at each of the operation reference points $C_s(X_m, Y_n)$, and a weighted sum of image data $P(X, Y)$ is calculated by using the template. For example, an equation, $$M(X_m, Y_n) = \sum_{i=0}^{I} T(x_i, y_i) \times P(X + x_i, Y + y_i)$$

is operated based on the template and the image data. Then, candidate points are obtained as candidate reference points having a weighted sum larger than a reference value. The candidate points are grouped into candidate point groups, and one of the groups most similar to the image of the object is determined as a position of the image. Thus, even if an image to be recognized is inclined, the position and the slope of the image can be detected at a fast speed even for image data with noise.

An advantage of the present invention is that a position of an object can he detected at a fast speed even if the object is inclined.

Another advantage of the present invention is that a position of an object can be detected in the presence of noise.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
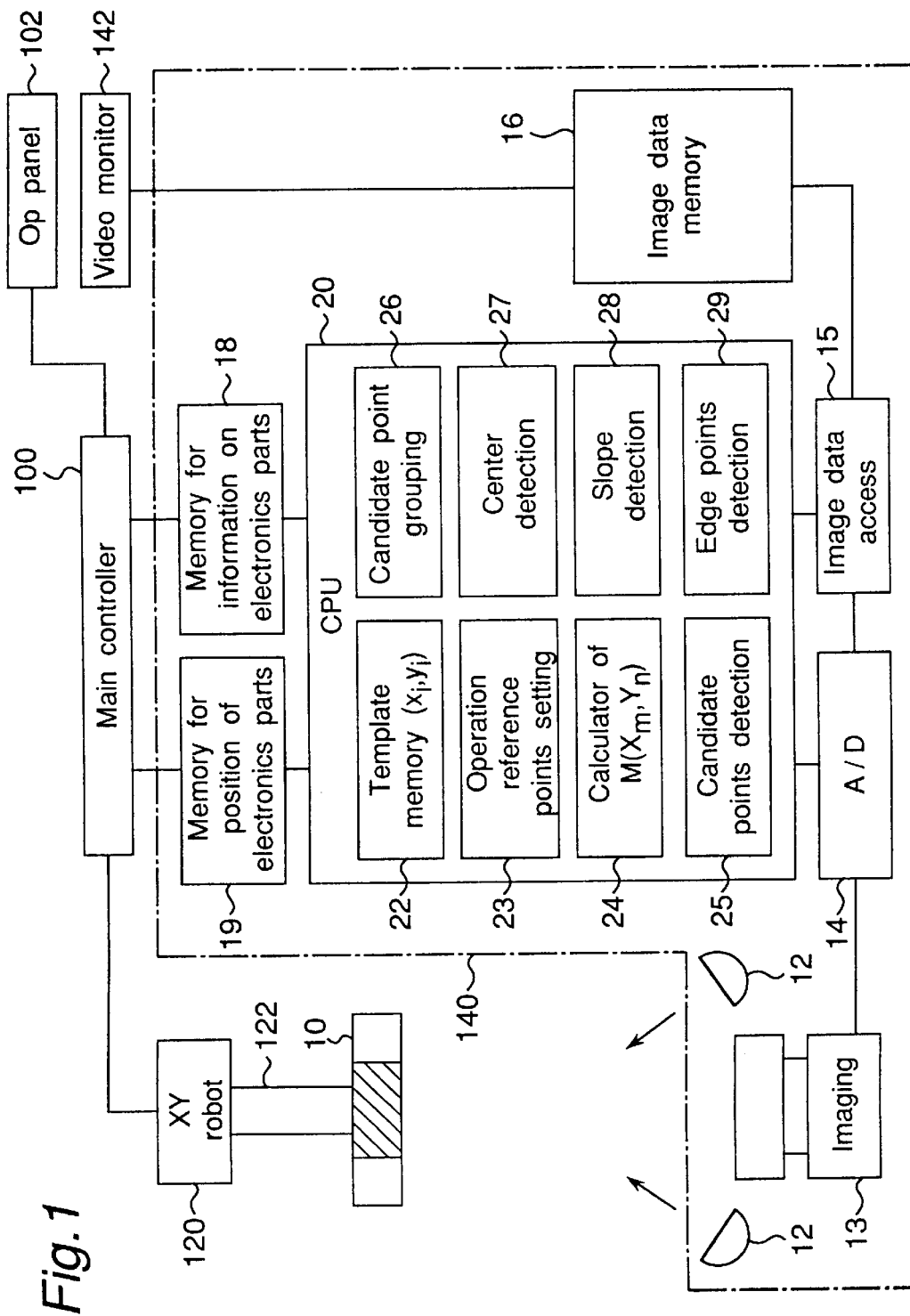
FIG. 1 is a block diagram of a pattern detection apparatus.

Referring now to the drawings, wherein like reference characters designate like or corresponding parts throughout the several views, FIG. 1 shows a pattern detection apparatus for mounting electronics parts onto a circuit board. The apparatus comprises a main controller 100, an XY robot 120 having a nozzle 122 for absorbing an electronics part 10, and an image recognition apparatus 140 which recognizes the electronics part 10. The main controller 100 controls the operation of the XY robot 120 and is connected to memories 18 and 19 for storing information on electronics parts and positions of the electronics parts, respectively. An operational panel 102 is connected to the main controller 100 for providing instructions, data and the like. Further, a microcomputer 20 in the image recognition apparatus 140 is connected through the memories 18 and 19 to the main controller 100.

The microcomputer 20 recognizes the image of the part 10 The part 10, held by the nozzle 122, is illuminated by lamps 12 and is imaged by an imaging device 13 such as a CCD sensor. The imaged data of the part 10 is digitized by an analog-to-digital (A/D) converter 14 as image data P(X, Y) which is stored by an image data access means 15 in an image memory 16. The stored image can be monitored by a video monitor 142. The microcomputer 20 includes various means such as template memory 22, operation reference setting means 23, a calculator 24 of $M(X_m, Y_n)$, a candidate points detection means 25, candidate points grouping means 26, center detection means 27, slope detection means 28 and edge points detection means 29.

Figure 2:
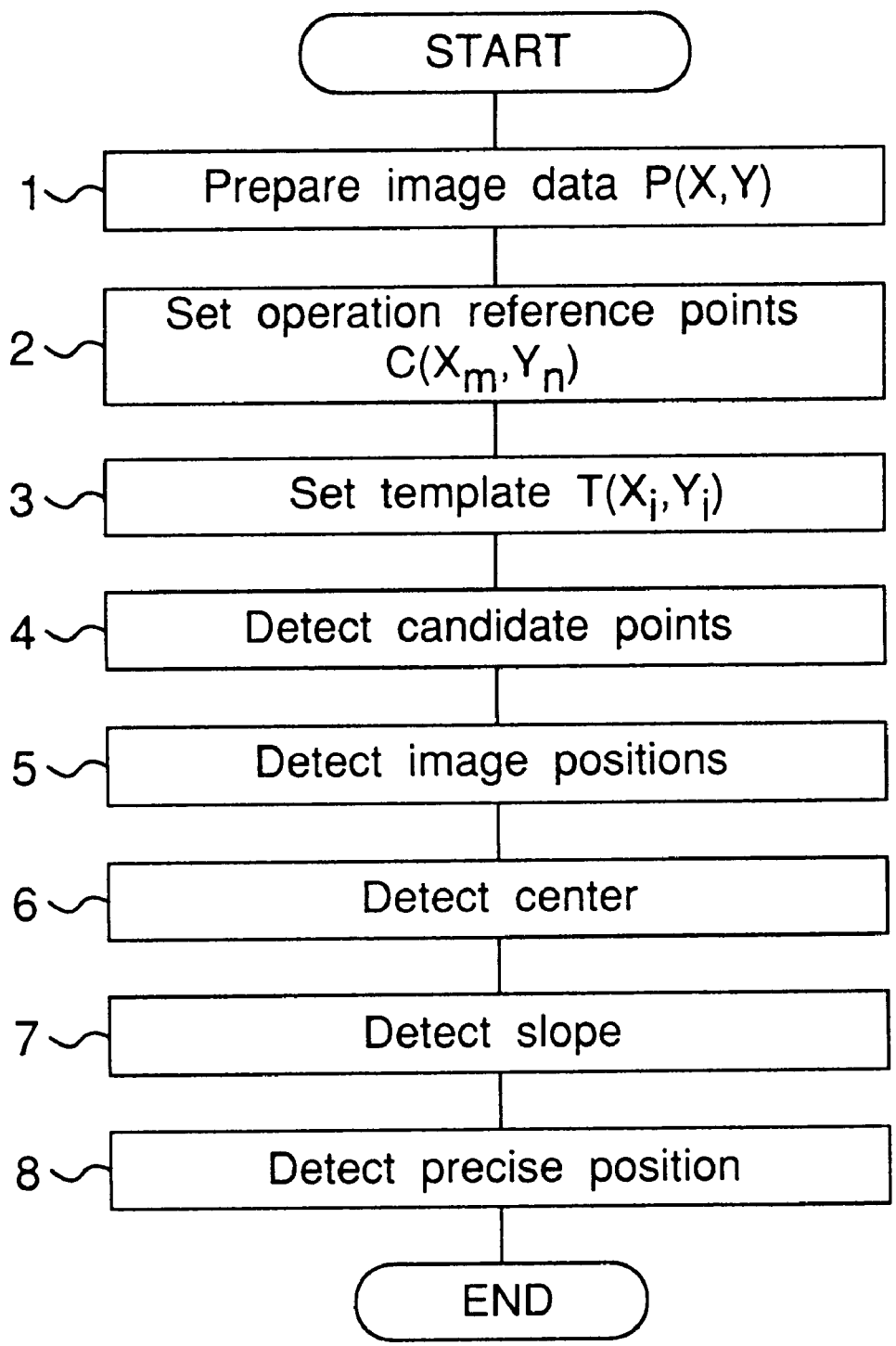
FIG. 2 is a flowchart of a pattern detection method of an embodiment of the invention.

FIG. 2 shows a flowchart of the microcomputer 18 for image recognition. First, image data P(X, Y) is measured and stored in the image memory 16 (step 1), where X and Y denote coordinates along the X and Y directions. That is, an electronic part 10 (an object to be detected) absorbed by the nozzle 122 of the XY robot 120 is illuminated by lamps 12 and is imaged by the imaging device 13. Then, the A/D converter 14 converts the imaged data into digital image data P(X, Y), and the digital image data P(X, Y) are stored in the image memory 16 under the control of the microcomputer 20. The images can be monitored by a video monitor 142.

Next, operation reference points $C_s(X_m, Y_n)$ are set at equal steps in the image data P(X, Y) through the image data access means 15 (step 2), where $X_m$ and $Y_n$ denote coordinates of an operation reference point and m and n denote orders of the point along X and Y directions among the operation reference points. As will be explained below in detail, the operation reference points $C_s(X_m, Y_n)$ are used not only for setting scanning points for a template (step 3), but are also used for forming candidate point groups resembling contours of images of the object to be recognized (step 4)

The steps of the operation reference points $C_s(X_m, Y_n)$ along the X and Y directions are smaller than lengths of the image along the X and Y directions. If these steps are sufficiently smaller than the size of an object to be recognized, the image of the object can be detected at a plurality of scanning points within the contours of the object, and as will be explained later, contours of candidate point groups will resemble the contour of the object.

Next, by referring to information on a size of leads or pins of the electronics part 10 stored in the memory 21, a template $T(x_i, y_i)$ is set so as to have a size smaller than an image of the object to be recognized and so as to have position reference points $T(x_o, Y_o)$ for agreeing with the operation reference points $C_s(X_m, Y_n)$. The template comprises pixels at offset addresses $(x_i, y_j)$, where i, j denote coordinates along X and Y directions, and $x_i$ and $y_j$ denotes coordinates along X and Y directions relative to the position reference point. A pixel at $T(x_o, y_o)$ is used as a position reference point. The template $T(x_i, y_i)$ is stored in the template memory 22 (step 3). Each pixel in the template has a prescribed value.

The template is not a pattern template or a matched filter conventionally used for matching a pattern of the image of the object, but is a brightness template for detecting the brightness of the image of the object. The template or matched filter conventionally used has either entirely or partly the same shape as the image of the object, and it does not function suitably if the image of the object is inclined. On the other hand, the template $T(x_i, y_i)$ of the invention has no similarity to the shape of the image of the object, and its size is much smaller than the size of the image of the object to be detected. It can detect the brightness levels in the image of the object by giving each pixel in the template a prescribed value to detect brightness levels by using Eq. (1). Because it has no relation to the shape of the object, it functions irrespective of the slope of the image of the object, and a contour of even an inclined image can be detected with candidate point groups described below by combining the operation reference points $C_s(X_m, Y_n)$. If the steps of the operation reference points $C_s(X_m, Y_n)$ and a size of the template $T(x_i, y_i)$ are set suitably smaller than the size of the image of the object, pattern position detection becomes possible for a desired detection accuracy and detection speed. The prescribed values of the pixels in the template $T(x_i, y_i)$ may be the same or different from each other. Practically, it is simple to use the same value for each pixel.

If the image of the object has distribution of little brightness, for example for cases of leads of an electronics part or leads of a circuit board, but its brightness has a difference from that of the background usually, then the image of the object can be detected with the template set in step 3, and the position of candidate points and the candidate point groups having the highest degree of similarity can be determined in the steps that follow.

Next, candidate points are detected (step 4). First, $M(X_m, Y_n)$ is calculated based on the template $T(x_i, y_i)$, and the image data P(X, Y) according to Eq. (1):

$$M(X_m, Y_n) = \sum_{i=0}^{l} T(x_i, y_i) \times P(X + x_i, Y + y_i)$$

by accessing the image data P(X, Y) stored in the image memory 16 through the data access means 15 and making the position reference point $T(x_o, y_o)$ of the template $T(x_i, y_i)$ agree with each of the operation reference points $C_s(X_m, Y_n)$. Then, candidate points are detected as operation reference points $C_s(X_m, Y_n)$ where $M(X_m, Y_n)$ is larger than a standard value Ma. Because Eq. (1) can be calculated at a high speed, the position of the image of the object can be detected fast.

Next, as to candidate point groups comprising a plurality of adjacent candidate points among the candidate points detected in step 4, a degree of similarity of a contour of each of candidate point groups to the image of the object is compared, and a position of a candidate point group having the largest degree of similarity among the candidate point groups is determined to be the position of the image of the object (step 5). A quantity used for the comparison of the degree of similarity may be selected among many quantities such as a number of candidate points in a candidate point group, or a ratio of lengths along the X and Y directions of a contour of a candidate point group. If the steps of the operation reference points $C_s(X_m, Y_n)$ and the size of the template $T(x_i, y_i)$ are set appropriately, the contour of the candidate point group sufficiently resembles the contour and the size of the image of the object. The result of the detection of the image position is sent to the memory 19 for storing positions of the electronic part 10. The main controller 100 uses the data for positioning the XY robot 120.

A position of the object is detected in steps 1–5. Next, the precision of the position detection is improved in the following steps. First, centers of the candidate point groups having the largest degree of similarity are calculated, and the position of the object is detected according to the calculated centers (step 6). If leads or pins of the electronic part 10 are taken as images of the object to be detected, a plurality of candidate point groups of the images are detected, and a plurality of centers thereof can be calculated. Then, a center of the object can be determined based on the centers of the plurality of images. Therefore, when an electronic part is mounted onto a board, the position of the part can be set precisely.

Next, a slope of the object is detected based on the centers of the plurality of the candidate point groups (step 7). If the leads or pins of the electronic part 10 are taken as the images to be detected, a slope of the object is calculated according to the centers of the images of the leads or pins. Therefore, when an electronic part is mounted onto a board, the position of the part 10 can be precisely corrected according to the center and the slope obtained in steps 6 and 7. By using the template $T(x_i, y_i)$; which does not resemble the contour of the object, the slope can still be detected precisely with one scanning.

Further, the precision of position detection is improved by detecting edge points of the images of the object. Linear windows along the X and Y directions are provided in correspondence to the slope detected above at the candidate point group having a contour most similar to the image of the object. Then, edge points of the image of the object are detected to determine the position (step 8). Then, the precision of position detection of the object having a slope can be improved because the slope of the image has already been corrected in step 7.

The position detection described above is explained in greater detail. First, templates $T(x_i, y_i)$ are explained with reference to FIGS. 3–10. It is desirable that the step of the operation reference points $C_s(X_m, Y_n)$ and a shape and size of a template $T(x_i, y_i)$ are set according to a contour and size of an object to be recognized, desired detection precision, and detection speed. For example, a user can set them with the operational panel 102.

Figure 3:
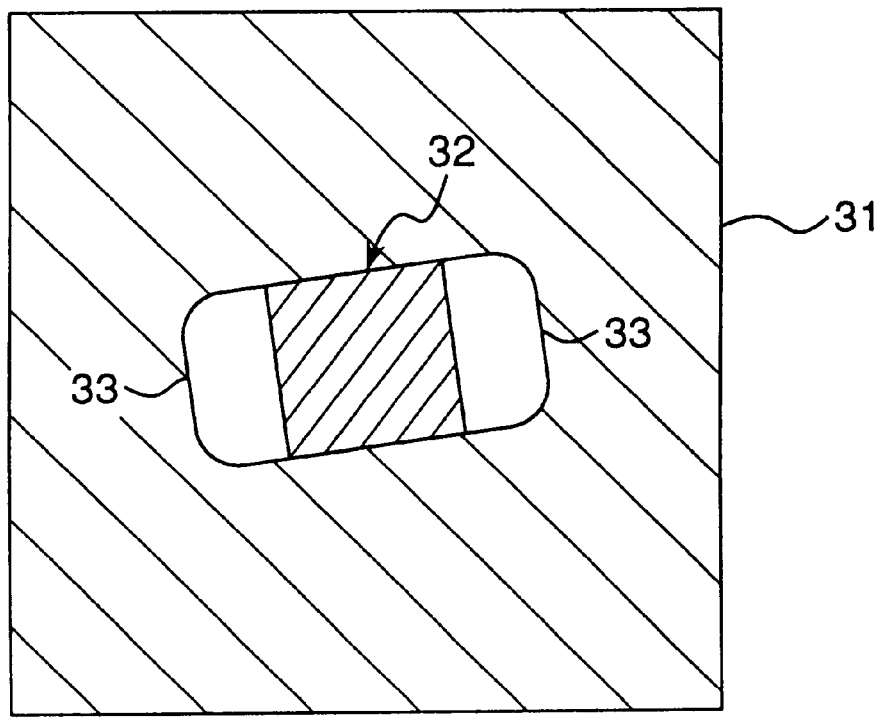
FIG. 3 is a diagram of image data P(X, Y)

FIG. 3 shows an example of image data P(X, Y) 31 stored in the image data memory 16 wherein data of an electronic part (capacitor) 32 and leads 33 thereof are included. The leads 33 are made of a metallic material, and they have image data larger than a part between them and the background. Then, they have large image data, and they are detected as described below.

Figure 4:
FIG. 4 is a diagram of a general example of a template $T(x_i, y_i)$.

FIG. 4 shows an example of a template $T(x_i, y_i)$ 34 set at step 3. The template 34 is set so that it is sufficiently smaller than the sizes of leads 33, as images of the object to be recognized, so that a plurality of the templates 34 can be included in each lead 33. As mentioned above, the template is a brightness template, and the contour of the template 34 is not similar to the those of the images of the leads 33 to be detected. If a large number of pixels of the templates 34 is included in each lead 33, a time needed for detection becomes long, but detection precision becomes better. Therefore, the template 34 is set to have an appropriate size according to the contour, size of the object, desired detection precision, and detection speed. Similarly, the number of pixels having non-zero weights may be reduced in comparison with the number of the total matrix elements.

Figures 5, 6:
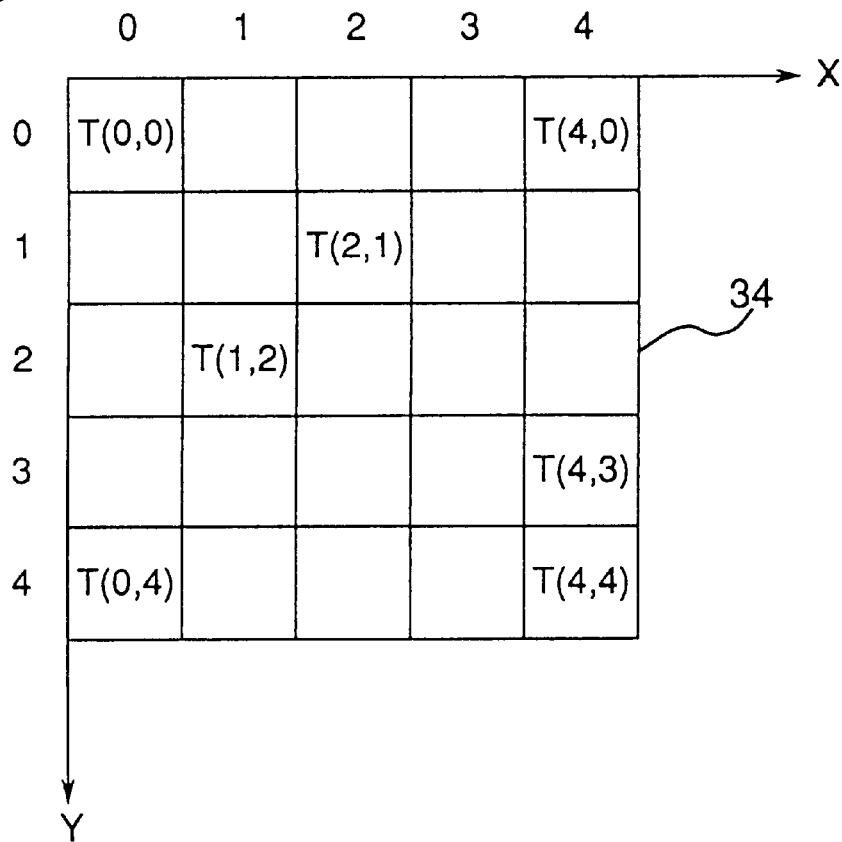
FIG. 5 is a diagram of a first example of a template $T(x_i, y_i)$.
FIG. 6 is a diagram on the template shown in FIG. 5.

FIG. 5 shows the brightness template $T(x_i, y_i)$ 34 made of 5×5 pixels for detecting brightness level of an image of an object, and FIG. 6 compiles the pixels at offset addresses $x_i$, $y_i$ in the template $T(x_i, y_i)$ and weights $G_k$ assigned to the pixels. Then, if the size of the template is determined as mentioned above, the offset addresses $x_i$, $y_i$ of the pixels $T(x_i, y_i)$ and weights $G_k$ can be set randomly as shown in FIG. 5. In the example shown in FIGS. 5 and 6, the number of pixels is seven from i=0 to 6.

Figures 7, 8:
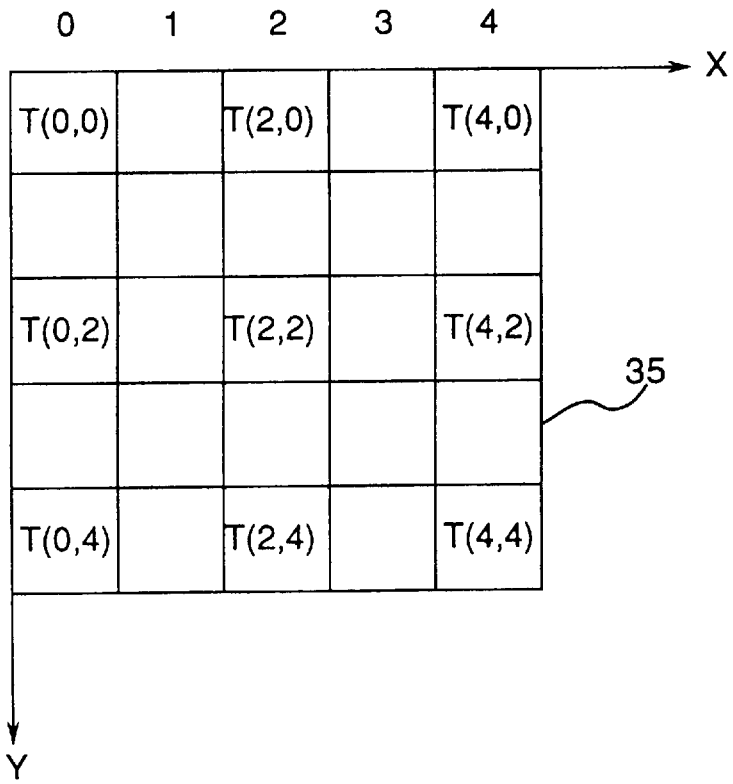
FIG. 7 is a diagram of a second example of a template $T(x_i, y_i)$.
FIG. 8 is a diagram on the template shown in FIG. 7.

FIG. 7 shows a second example of a template $T(x_i, y_i)$ 35 made of 5×5 pixels, and FIG. 7 compiles offset addresses $x_i$, $y_i$ of pixels $T(x_i, y_i)$ and weights $G_k$ of the template assigned to the pixels. In the example shown in FIGS. 7 and 8, the number of pixels is nine. The position reference points are arranged regularly every third pixel.

Figure 9:
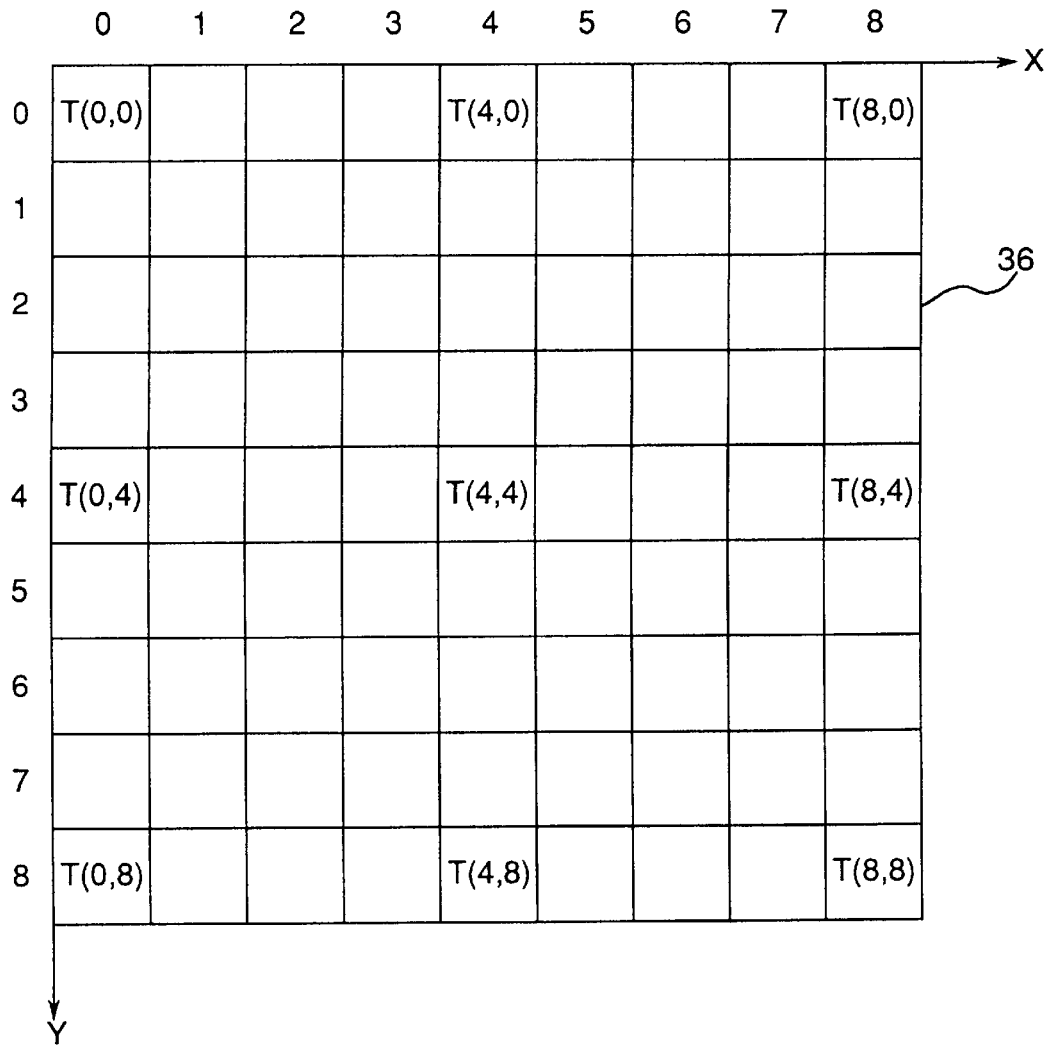
FIG. 9 is a diagram of a third example of a template $T(x_i, y_i)$.
Figure 10:
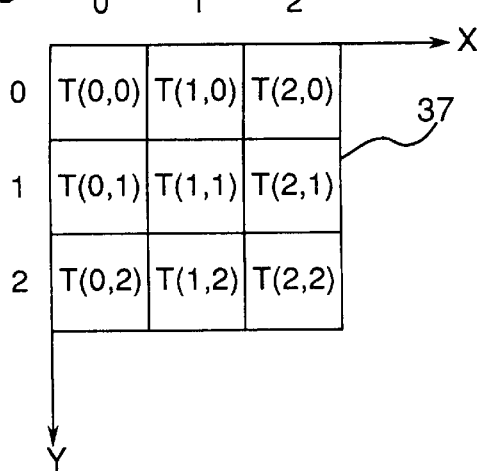
FIG. 10 is a diagram of a fourth example of a template $T(x_i, y_i)$.

FIG. 9 shows an example of a template $T(x_i, y_i)$ 36 of 9×9 pixels. In the example shown in FIG. 9, the number of position reference points is nine from i=0 to 8, and the pixels are arranged regularly every fifth pixel. FIG. 10 shows a different example of a template $T(x_i, y_i)$ 37 of 3×3 pixels. The number of pixels is nine, and all elements in the matrix are used as pixels.

The position reference point of $T(x_i, y_i)$ may be set at any pixel shown in the templates shown in FIGS. 5, 7, 9 and 10, though it is set at (0, 0) above.

Figure 11:
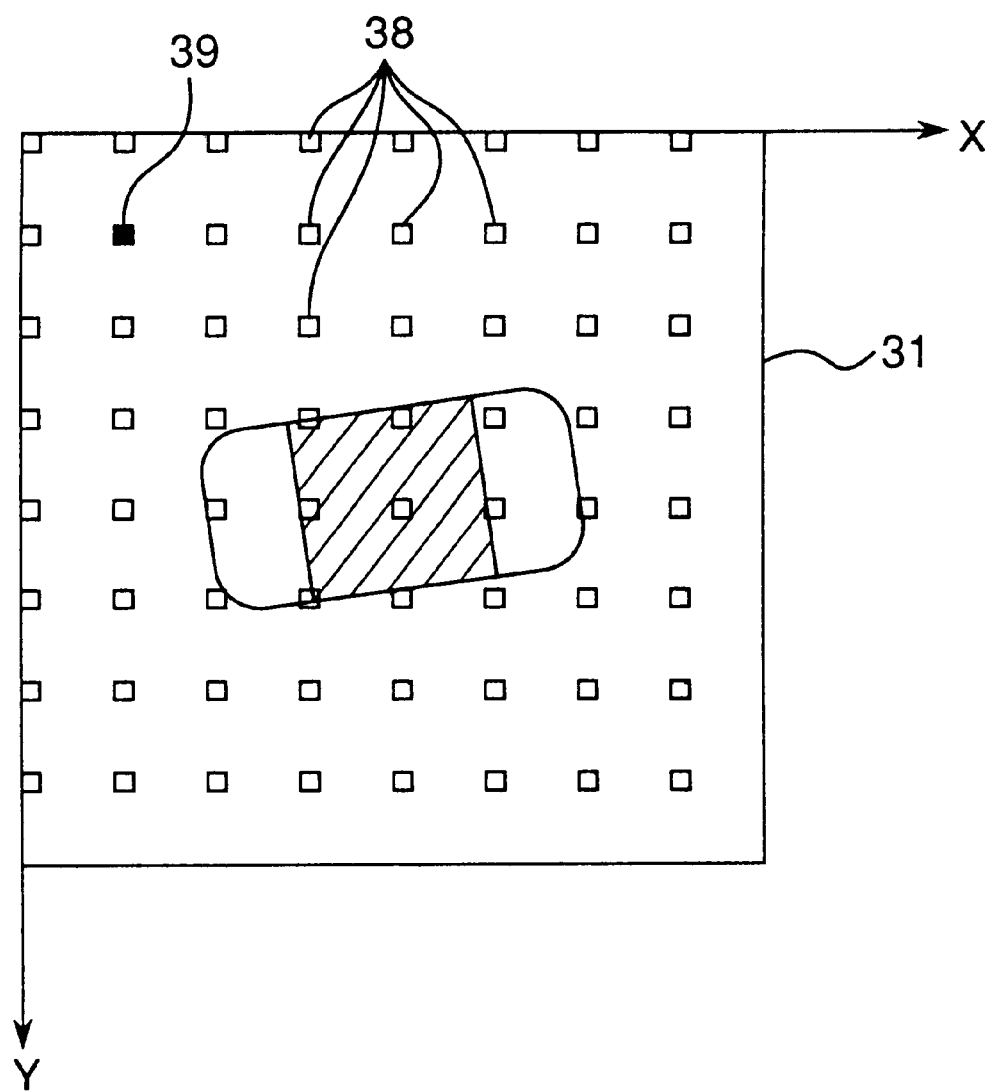
FIG. 11 is a diagram of operation standard point $C_s(X_m, Y_n)$.
Figure 15:
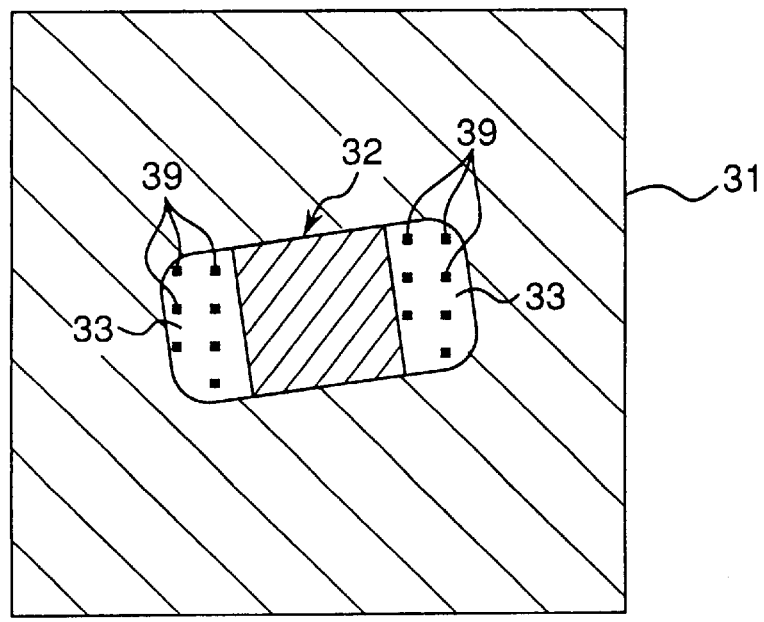
FIG. 15 is a diagram illustrating candidate point groups.
Figure 16:
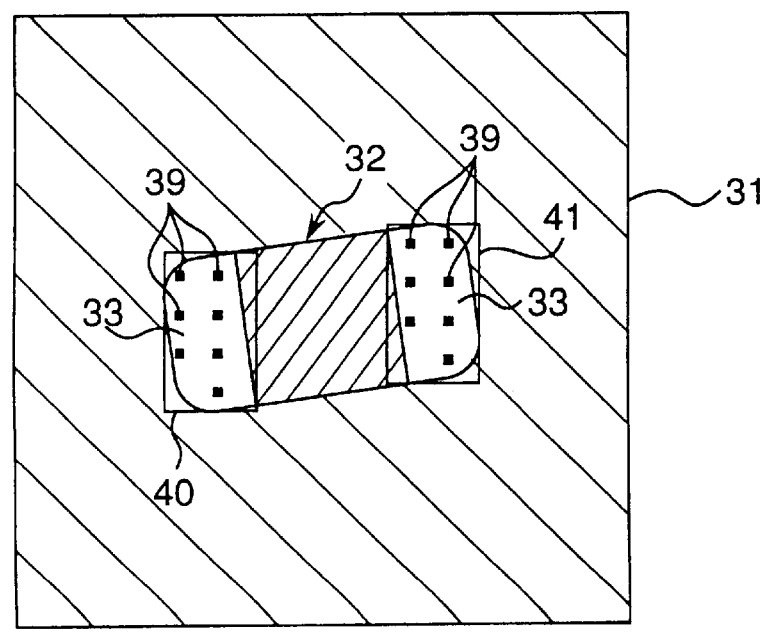
FIG. 16 is diagram illustrating point detection using the candidate point groups.
Figure 17:
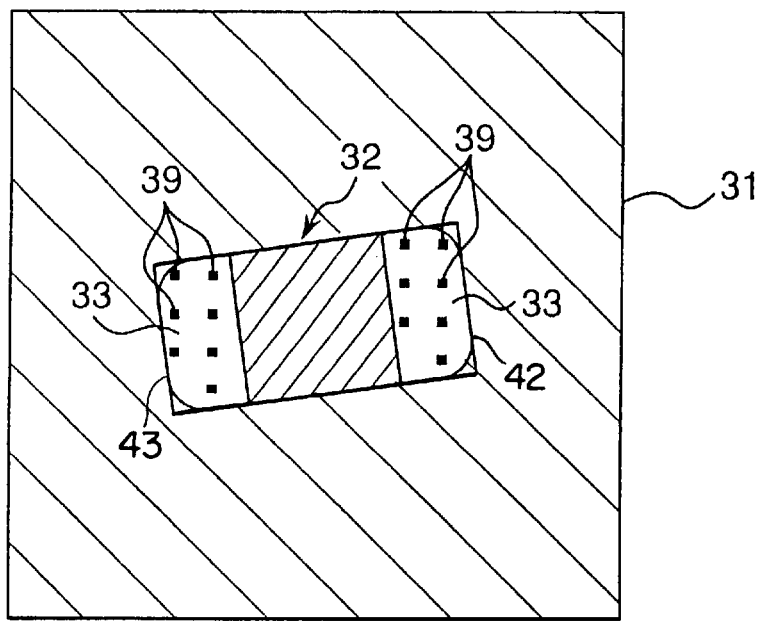
FIG. 17 is a diagram illustrating point detection using the candidate point groups.

Next, operation reference points $C_s(X_m, Y_n)$ used at step 4 are explained with reference to FIG. 11 which shows a general example. Operation reference points $C_s(X_m, Y_n)$ 38 are set at equal steps, as shown in FIG. 11, and the steps are smaller than lengths of the image along the X and Y directions. It is desirable that the step of the operation reference points $C_s(X_m, Y_n)$ and the shape and the size of the template $T(x_i, y_i)$ are set according to the shape and size of an object to be recognized, desired detection accuracy, and detection speed. In FIG. 11, m and n which denote orders of the operation reference points along the X and Y directions ranges from zero to seven, and the steps shown in FIG. 11 are too large though the steps are smaller than lengths of the image along the X and Y directions. Thus, the steps are actually set much smaller than those shown in FIG. 11, as shown in FIGS. 15–17.

Figure 12:
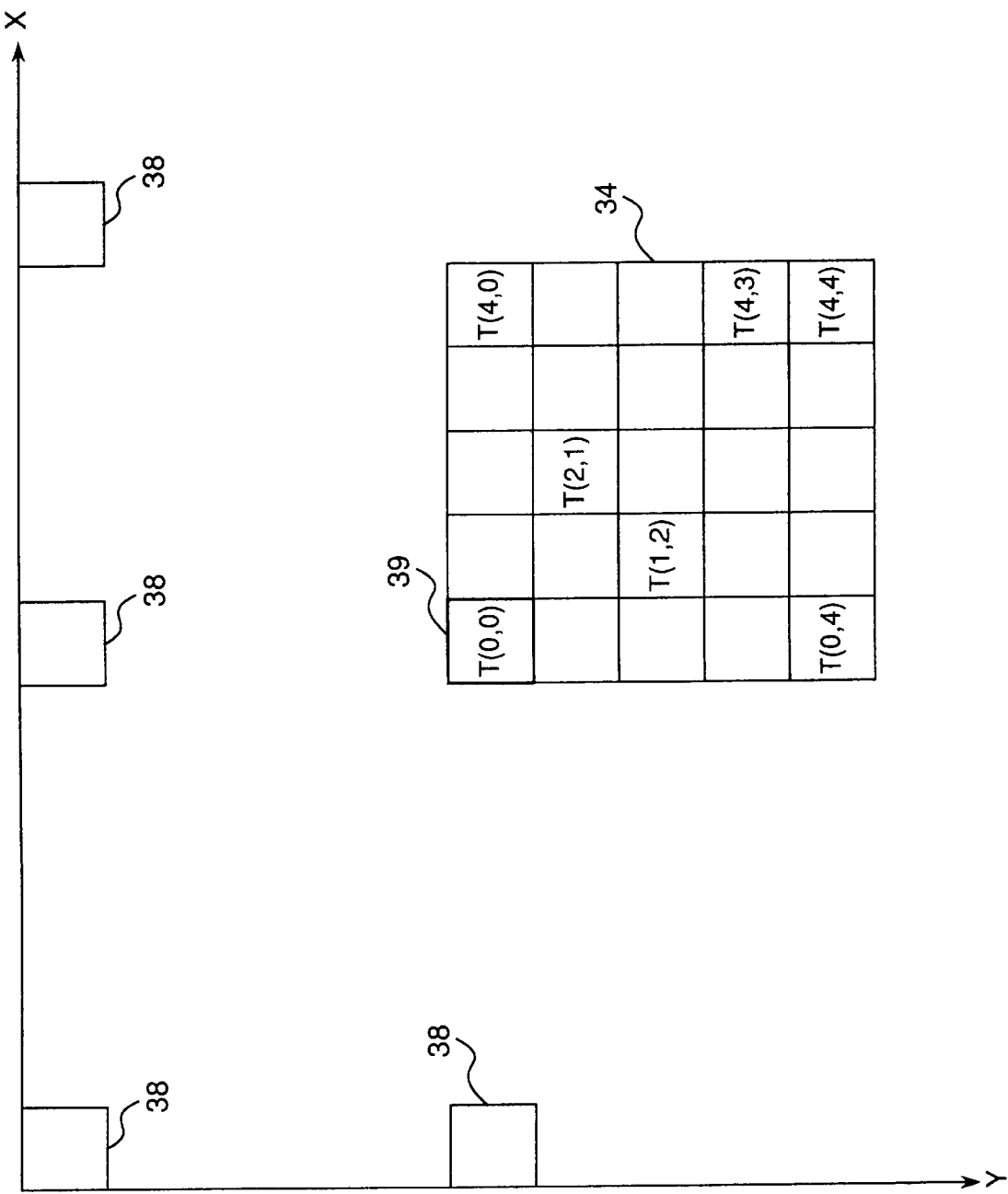
FIG. 12 is a diagram illustrating an operation of Eq. (1)
Figures 13, 14:
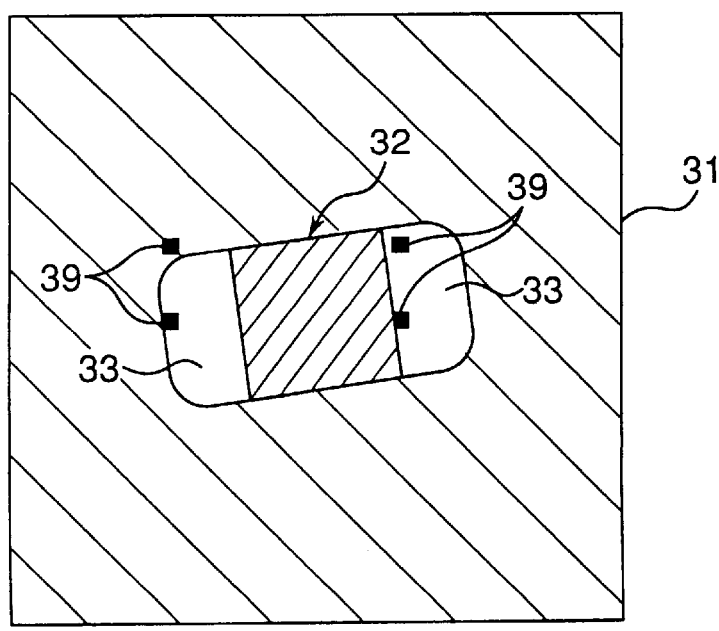
FIG. 13 is a diagram of data used in Eq. (1)
FIG. 14 is a diagram illustrating candidate points.

Next, detection of candidate points 39 (step 4) is explained with reference to FIGS. 12–15. In FIG. 12, the position reference point $T(x_0, y_0)$ in the template 34 is set successively at the operation reference points $C_s(X_m, Y_n)$ 38 set in the image data P(X, T) 31. In a case shown in FIG. 12, the position reference point $T(x_0, y_0)$ coincides with an operation reference point at m=n=1. FIG. 13 shows data detected with the template 34. The 0-th to 6-th pixels at positions $(x_i, y_i)$ in the template 34 correspond to coordinates $(X+x_i, Y+y_i)$. Then, the image data $P(X+x_i, Y+y_i)$ are obtained with reference to the memory 16.

Next, Eq. (1) is operated based on the image data $P(X+x_i, Y+y_i)$ and weights shown in FIG. 13 for each operation reference point $C_s(X_m, Y_n)$ 38.

$$M(X_m, Y_n) = \sum_{i=0}^{I} T(x_i, y_i) \times P(X + x_i, Y + y_i)$$

Then, operation reference points having $M(X_m, Y_n)$ in Eq. (1) larger than a reference value Ma are detected as candidate points 39 as shown in FIG. 12.

In FIG. 14, an electronic part (capacitor) 32 and two images 33 of the leads thereof exist in the image data P(X, Y) 31. Reference numbers 39 show four candidate points detected according to the procedure explained above. Actually, as shown in FIG. 15, a smaller step is adopted, and more candidate points 39 are detected in the images 33.

Next, detection of the image position (step 5 in FIG. 2) is explained with reference to FIGS. 16 and 17. The detected candidate points are grouped into a plurality of candidate point groups each including a plurality of candidate points 39 adjacent to each other. Contours of the candidate point groups are compared for similarity to that of the images 33, of the leads. The comparison is calculated with a known pattern matching technique. Then, a candidate group having the most similar contour to the image 33 of the leads is determined as a position of the images 33 of the leads. Even if the image data include noise, the correct position can be detected. For example, a candidate point 39 may exist outside the object and this will not affect the determination of the position.

As shown in FIG. 15, each of two images 33 has seven candidate points 39, and two positions or contours 40 and 41 of candidate point groups including the candidate points 39 are determined, as shown in FIG. 16. In the example shown in FIG. 16, the positions 40 and 41 are rectangular and have sides along the X and Y direction.

If the images are not inclined with respect to the X or Y direction, there would exist eight candidate points in the image 33 of the lead or a maximum candidate points would be detected. By taking this point into account, the positions 40 and 41 of the candidate point groups including seven to nine candidate points are used for detecting positions of the images 33.

FIG. 17 shows a case where the slope of the image is corrected. If the slope is taken into account, numbers of lines of the candidate points located in the image 33 along the X direction and along the Y direction are two and either three or four, respectively. Then, the positions or contours 42 and 43 of candidate point groups having the numbers of two and three or four along the X direction and along the Y direction are detected as positions of the images 33. It is to be noted that the positions or contours 42 and 43 are rectangular in parallel and perpendicular to the detected slope.

Figure 18:
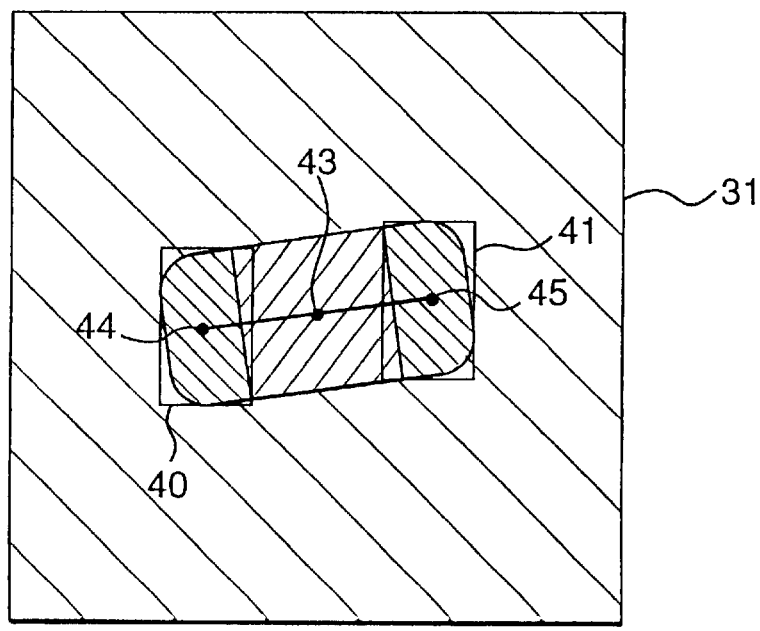
FIG. 18 is a diagram illustrating a center and a slope of an image of an object to be recognized.

Next, detections of the center and the slope of the object (steps 6 and 7) are explained. As to the two candidate point groups shown in FIG. 16, coordinates 44 and 45 of the center positions and the slope are determined on the positions 40 and 41 of the candidate point groups having seven to nine candidate points 39, as shown in FIG. 18. That is, the center positions 44, 45 are calculated for each position as $(S_x/N, S_y/N)$, and the slope is calculated as $\frac{1}{2} \tan^{-1}(S1/S2)$, wherein $$S1 = 2(N*Sxy - Sx*Sy), \quad (2)$$

$$S2 = (N*Sxx - Sx*Sy) - (N*Syy - Sx*Sy), \quad (3)$$

$$N = \sum^{y} \sum^{x} P(X, Y) \quad (4)$$

-continued $$Sx = \sum^{y} \sum^{x} P(X, Y)x \quad (5)$$

$$Sy = \sum^{y} \sum^{x} P(X, Y) \quad (6)$$

$$Sxx = \sum^{y} \sum^{x} P(X, Y)x^2 \quad (7)$$

$$Syy = \sum^{y} \sum^{x} P(X, Y)y^2 \quad (8)$$

and $$Sxy = \sum^{y} \sum^{x} P(X, Y)xy \quad (9)$$

The calculation technique for the center positions and the slope is not limited to the above-mentioned description. A center of the object can be determined as a mid point 43.

Figure 19:
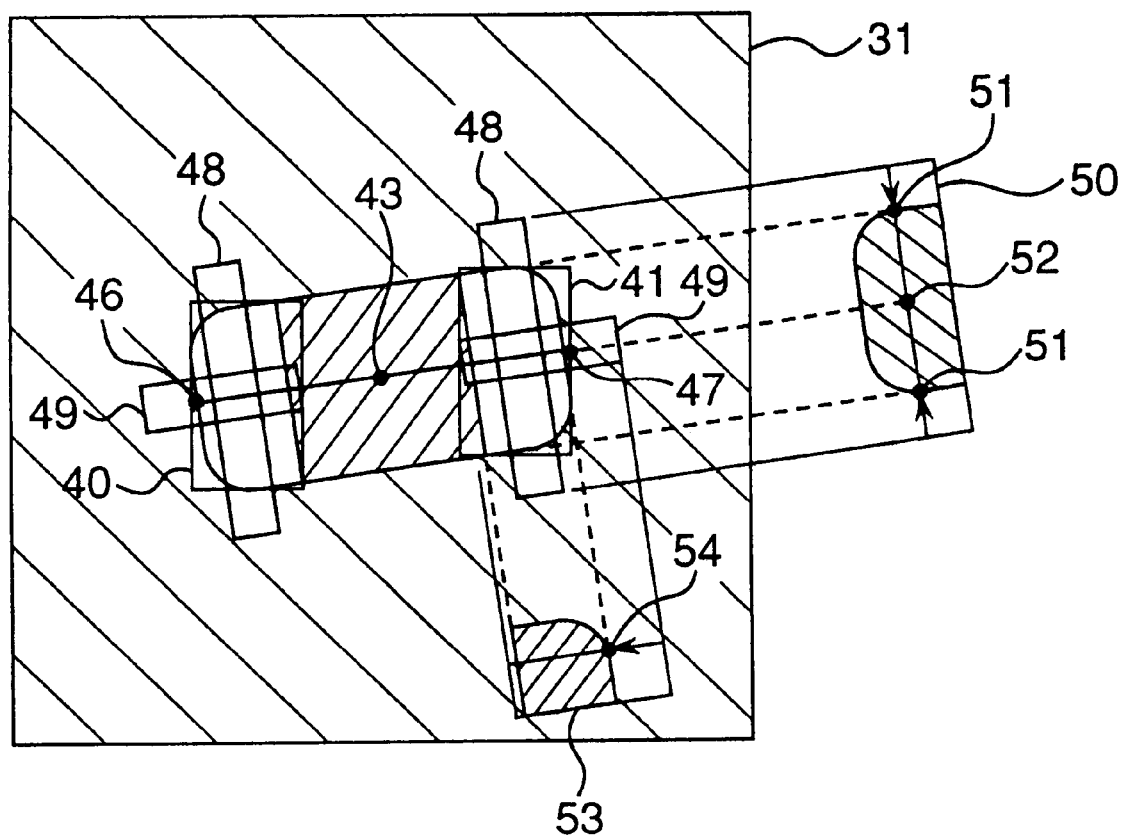
FIG. 19 is a diagram of precise position detection.

Next, the detection of the precise position (step 8) is explained with reference to FIG. 19. In FIG. 19, there are two candidate point groups which have a number of lines of candidate points, and two pairs of linear windows 48 and 49 which are set in parallel and perpendicularly to a slope passing through the mid point 43 at the two candidate point groups. Then, edge points of the images to be recognized are detected, and the positions of the images are precisely decided.

In the precise detection, linear windows may be used to scan along constant directions, and edge points may be used where the brightness changes largely. However, in the embodiment, the linear windows 48 and 49 are linear windows for projection. Reference number 50 denotes a projection of the linear window 48 along the Y direction of the position 41 of the candidate point group. Image data after the projection is scanned from the external side to determine two edge points 51, and a midpoint 52 between the edge points 51 is determined. On the other hand, reference number 53 denotes a projection of the linear window 49 along the X direction of the position 41 of the candidate point group. Image data after the projection is scanned from the external side to determine an edge point 54. An end point 47 of the right lead is determined from the edge points 52 and 54. As to the left lead, an end point 49 thereof is determined similarly. Then, the position of the object to be recognized can be precisely detected from the end point 47 of the right lead and the end point 49 of the left lead. It is to be noted that a midpoint between the end points 47 and 49 is taken as the center 43 of the electronic part, and a slope of a line connecting the two end points 47 and 49 is taken as a slope of the object.

Figure 20:
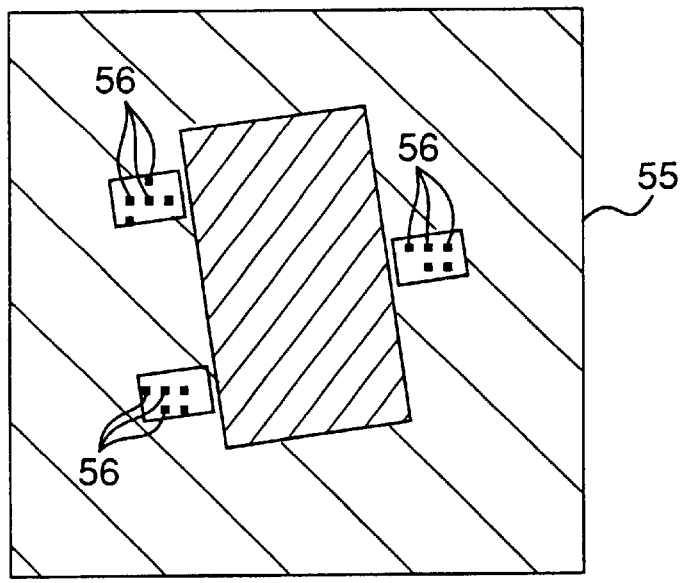
FIG. 20 is a diagram of candidate point groups in a case of a 3-terminal electronics part.
Figure 21:
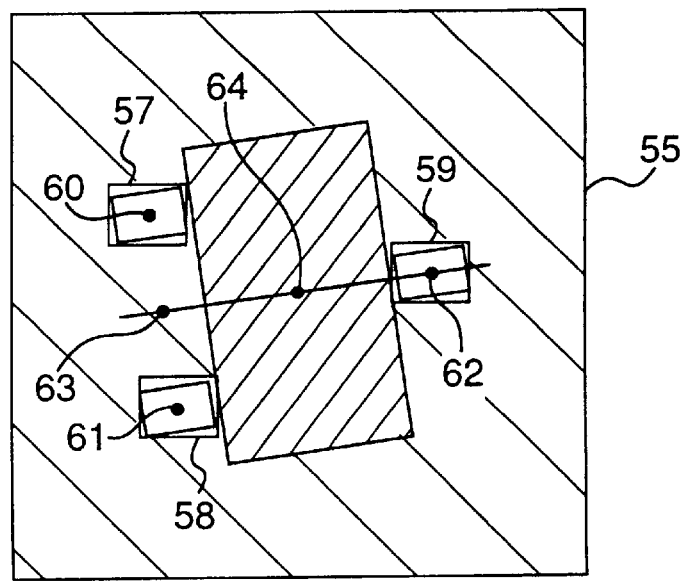
FIG. 21 is a diagram of the detection of a center and a slope of a 3-terminal electronics part.

FIGS. 20 and 21 show a different example of an electronic part having three leads, and the three leads are images to be detected. FIG. 20 shows a result of the detection of candidate points (step 4). A candidate point group 56 is detected for each of the three leads.

FIG. 21 shows a result of the detection of the slope (step 7). There are successively determined three positions 57, 58 and 59, centers 60, 61 and 62 of candidate point groups, a midpoint 63 between the centers 60 and 61, a midpoint between the center 62 and the midpoint 63 as the center 64 of the part.

Such processing is also possible for a part having more than four leads because a plurality of leads are arranged symmetrically in an electronic part having a plurality of leads. If there in no symmetry, correction is needed to take asymmetry into account.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims.

What is claimed is:

1. A method of pattern detection comprising the steps of:

obtaining an image of an object;

converting the image obtained into two-dimensional image data $P(X, Y)$ at points $(X, Y)$, wherein X and Y denote coordinates existing along two directions perpendicular to one another;

setting operation reference points $C_s(X_m, Y_n)$ in two dimensions spaced from each other by a step size which is smaller than a size of the image of the object, wherein $X_m$ and $Y_n$ denote m-th and n-th coordinates existing along two directions and m and n denote integral numbers;

providing a two-dimensional template having a size smaller than the image of the object and having weights $T(x_i, y_i)$ at a plurality of points $(x_i, y_i)$ wherein $x_i$ and $y_i$ denote x and y coordinates of an i-th point and i denotes an integral number;

setting a position reference point of the template $T(x_i, y_i)$ at each of the operation reference points $C_s(X_m, Y_n)$;

calculating a weighted sum of the image data $P(X, Y)$ by using the template $T(x_i, y_i)$ for each of the operation reference points $C_s(X_m, Y_n)$;

determining the operation reference points $C_s(X_m, Y_n)$ as being candidate points when the weighted sum thereof is larger than a predetermined value;

grouping the candidate points into candidate groups comprising a plurality of adjacent candidate points, wherein the candidate groups sufficiently define a representative contour of the object; and determining a position of the object based on positions of the candidate groups.

2. The method according to claim 1, wherein a size of the two-dimensional template is smaller than that of the image to be detected.

3. The method according to claim 1, wherein a shape and the size of the template $T(x_i, y_i)$ are set according to a shape and pattern of the image of the object, a desired detection precision, and a desired detection speed.

4. The method according to claim 1, wherein the step size of the operation reference points $C_s(X_m, Y_n)$ are set according to a shape and pattern of the image of the object to be detected, a desired detection precision, and a desired detection speed.

5. The method according to claim 1, wherein the template has weights which are non-zero.

6. The method according to claim 5, wherein the non-zero weights are equal.

7. The method according to claim 1, further comprising the step of detecting a center position of the candidate points in the candidate point group.

8. The method according to claim 7, wherein the object comprises a plurality of images to be detected, the method further comprising the step of detecting a slope of the images of the object based on the center positions of a plurality of the candidate point groups.

* * * * *